United States Patent [19]

Schramm

[11] 4,294,875

[45] Oct. 13, 1981

[54] INSULATION PANEL

[76] Inventor: Arthur G. Schramm, 8780 E. McKellips Rd., Space 125, Scottsdale, Ariz. 85257

[21] Appl. No.: 26,668

[22] Filed: Apr. 3, 1979

Related U.S. Application Data

[63] Continuation-in-part of Ser. No. 937,266, Aug. 31, 1978, abandoned.

[51] Int. Cl.³ .............................................. B32B 3/12
[52] U.S. Cl. ........................................ 428/72; 428/117
[58] Field of Search ................ 428/2, 72, 73, 74, 116, 428/117, 182

[56] References Cited

U.S. PATENT DOCUMENTS

| | | | |
|---|---|---|---|
| 1,228,763 | 6/1917 | Ellis | 428/72 |
| 1,637,497 | 8/1927 | O'Dowd | 428/56 |
| 1,735,877 | 11/1929 | Payne | 156/40 |
| 1,765,796 | 6/1930 | Kirschbraun | 428/76 X |
| 1,961,888 | 6/1934 | Lindsay | 428/74 |
| 1,974,519 | 9/1934 | Steffens | 428/74 |
| 2,102,233 | 12/1937 | Biederman | 428/72 |
| 2,113,068 | 4/1938 | McLaughlin, Jr. | 428/74 |
| 2,342,839 | 2/1944 | Byers | 428/182 X |
| 2,607,104 | 8/1952 | Foster | 428/182 X |
| 2,839,442 | 6/1958 | Whitaker | 428/73 X |
| 2,913,104 | 11/1959 | Parker | 52/406 X |
| 3,018,205 | 1/1962 | Barut | 428/116 |
| 3,141,206 | 7/1964 | Stephens | 52/406 X |
| 3,186,896 | 6/1965 | Clem | 428/117 X |
| 3,227,601 | 1/1966 | Crosby | 428/116 X |
| 3,364,097 | 1/1968 | Dunnington | 428/117 |
| 3,526,556 | 9/1970 | Berner | 428/117 X |
| 3,544,417 | 12/1970 | Corzine | 428/117 X |
| 3,650,871 | 3/1972 | Bentfors | 428/117 X |
| 3,718,536 | 2/1973 | Downs et al. | 428/2 X |
| 3,857,752 | 12/1974 | McCoy | 428/74 |
| 3,949,036 | 4/1976 | Nelson | 428/2 X |
| 3,975,882 | 8/1976 | Walter | 428/116 X |
| 4,070,839 | 1/1978 | Clem | 428/117 X |
| 4,150,186 | 4/1979 | Kazama | 428/178 X |

*Primary Examiner*—Henry F. Epstein
*Attorney, Agent, or Firm*—Don J. Flickinger

[57] ABSTRACT

Marginal edge portions of two spaced apart flexible sheets are folded inwardly and joined to form an envelope. A plurality of laterally extending substantially rigid panels divide the envelope into a plurality of partitioned compartments. Each panel is angularly disposed relative each adjacent panel and the panels are fixed to the envelope, thereby providing a semi-rigid structure. Fibrous insulation material, especially cellulosic material such as treated ground paper, is contained in each compartment.

4 Claims, 18 Drawing Figures

INSULATION PANEL

The instant application is a continuation in part application of the common inventor's prior filed co-pending application Ser. No. 937,266 filed Aug. 31, 1978 entitled "Insulation Panel", now abandoned.

This invention relates to thermal insulation.

More particularly, the present invention relates to batt insulation of the type commonly used in building structures.

In a further aspect, the instant invention concerns a substantially rigid insulation panel especially adapted for use with cellulose type insulation material.

Residential and commercial buildings and other structures are thermally insulated by various means familiar to those skilled in the art. Particularly well known is batt insulation. Briefly, batt insulation includes a insulative filler material contained within the outer covering.

Commonly, the outer covering is fabricated of two sheets, generally specially treated paper, which are secured along a continuous seam near each respective edge to form a tube-like structure. A preferred contemporary insulative filler material is fiberglass. Commercially available, the soft, flexible batt is usually packaged in rolls. Typically a roll of batt insulation contains 77 square feet of fifteen-inch wide material or 90 square feet of twenty-three inch wide material.

The fifteen-inch and twenty-three inch dimensions correspond to the distance between framing members, joists and rafters, in accordance with conventional construction practice. During installation, the rolls are cut into length as required. Due to matting characteristics, as exemplified by the interlocking of spun glass fibers, the filler material does not escape from the severed end of the outer covering. While being temporarily held in place, batt insulation is permanently secured by staples passed through the edges of the outer covering into the framing members.

Batt type insulation, as generally described above and utilizing various natural and synthetic fillers, has been the accepted standard for many years. Recently, in response to environmental awareness, especially conservation of energy and material, a new insulative material has been developed. The new material, commonly referred to as cellulose, is manufactured from recycled paper which is shredded and ground. In order to provide a satisfactory product, and comply with various government regulations, the paper is chemically treated during grinding to remove toxicity and to insure resistance against fire, rodents, corrosion and fungus.

For a more thorough understanding of cellulosic insulation materials, attention is directed to U.S. Pat. application Ser. No. 870,385 filed Jan. 18, 1978 entitled SMOLDER AND FLAME RESISTANT INSULATION MATERIALS, COMPOSITION AND METHOD, now abandoned.

While the insulative materials are of comparable cost, cellulose is preferred to fiberglass for various reasons. Most significantly, the insulative value of cellulose exceeds the insulative value of fiberglass by approximately eighty percent. Currently there has developed an awareness on a national level of the conservation of energy and natural resources. In view thereof, the increased insulative value of cellulose is especially significant. Similarly, it is noted that cellulose is manufactured from recycled waste material.

Certain inherent limitations, however, for which the prior art has not provided satisfactory solutions, has curtailed general commercial acceptance of cellulose insulation. The limitations are a direct result of the granular characterisitics of cellulose which prevents matting as in other types of insulative material. When utilized in a conventional outer covering, the individual granules of cellulose will settle during shipment and installation. The settling, approximately one to two inches in a standard residential wall, leaves an uninsulated area along the top of the structure. Further, the integrity of the outer covering must be observed, since any tear in the paper will allow the escape of the cellulose.

The applicant in the instant case is aware of substantial prior art concerning insulative materials and insulation structures. A search of records within the files of the United States Patent and Trademark Office, conducted at the request of applicant, revealed the following issued United States Patents:

| | |
|---|---|
| 1,126,187 Ellis | 3,542,636 Wandel |
| 1,236,829 Evans | 3,544,417 Corzine |
| 2,330,941 Acuff, Jr. | 3,819,466 Winfield et al |
| 2,575,758 Herd | 3,975,882 Walter |
| 2,786,004 Schwartz et al | 4,057,936 Wyatt, Jr et al |
| 2,881,304 Dobson et al | 4,057,944 Wyatt, Jr et al |
| 3,166,800 Zoldok | 4,070,839 Clem |
| 3,186,896 Clem | |

During prosecution of said patent application, Ser. No. 937,266, the Examiner issued an office action in which the following United States Patents were cited:

| | |
|---|---|
| 2,342,839 Byers | 1,961,888 Lindsay |
| 1,765,796 Kirschbraun | 1,228,763 Ellis |
| 1,974,519 Steffens | 2,102,233 Biederman |
| 2,113,068 McLaughlin Jr | 2,607,104 Foster |
| 3,718,536 Downs et al | 3,949,036 Nelson |

Additionally, applicant is aware of patents and patent applications cited in *Cellulose* 1, a technical presentation pertinent to the cellulose fiber industry sponsored by the U.S. Department of Energy. Contained within the manual are the following issued United States Patents:

| | |
|---|---|
| 12,882 Weiser | 374,208 Sewall |
| 923,358 Jewett | 3,953,165 Pepperman et al |
| 3,932,123 Chance et al | 1,718,507 Wenzel et al |
| 1,837,261 Gerard et al | 1,837,261 Gerard |
| 1,931,570 Brown et al | 1,978,125 Bennett |
| 2,147,793 Kropp | 2,166,926 Kropp |
| 2,335,220 Edwards | 2,411,559 Sonin et al |
| 2,553,781 Oliver | 2,639,759 Simison |
| 2,744,045 Collins | 3,877,974 Mischutin |
| 3,955,032 Mischutin | 3,974,310 Mischutin |

The manual also includes a copy of application for U.S. Letters Patent, Ser. No. 870,385 filed Jan. 18, 1978 and entitled "Smolder and Flame Resistant Insulation Materials, Composition and Method".

Of the several references, U.S. Pat. No. 2,342,839 is of particular interest. Disclosed is an insulating blanket having an intermediate ply mounted between covering plies. The intermediate ply, which is of corrugated sheet material, follows an undulating path between covering plies in order to obtain flexibility. The covering plies carry an undercoating of wax and a coating of asphaltic material which moisture proofs the blanket and provides means for securing together the several plies. Fabricated in continuous length, the blanket is rolled for shipment and cut to proper length at time of installation.

It is especially noted that the short fiber insulation takes the shape of formed bodies. The intermediate ply holds the bodies in place and, accordingly, it is not essential that the intermediate ply extend the width of the blanket nor divide the blanket into compartments.

Of immediate concern in connection with the instant invention is thermal insulation manufactured predominantly from cellulosic or wood fibers. The material is characteristicly composed of individual granules which can be passed through a screen. Standards for insulation of the type under discussion are set forth in federal specification HH-I-515D. Termed "loose fill" the material is intended for pneumatic or poured application, especially in horizontal structures such as attic space.

It is immediately apparent that insulation of the type set forth in the foregoing federal specification is not intended for use in insulation batts or blankets installed in vertical structures. It is also apparent that U.S. Pat. No. 2,342,839 was not intended to contain loose fill insulation material as is indicated by several references within the text. In fact, it is generally inconsistent with the prior art as a whole to provide an insulation structure for use with insulation material of the immediate type.

Accordingly, it is an object of the instant invention to remedy the deficiencies associated with the prior art and provide a practical means for utilizing cellulosic type insulation material.

Another object of the invention is the provision of an insulation structure generally analagous to conventional batt type insulation and filled with cellulosic or wood fiber thermal insulation, especially the type generally termed loose fill.

And another object of the invention is to provide a prefabricated insulation structure which is sized and shaped to be received between the framing members of conventional construction.

Still another object of the present invention is the provision of an insulation structure in the form of a semirigid panel.

Yet another object of the invention is to provide an improved insulation structure which can be installed with conventional tools and common skills.

And yet another object of the invention is the provision of a cellulose filled insulation batt which can be cut to a desired length during installation.

A further object of this invention is to provide an insulation structure which is unaffected by the settling characteristics of cellulose.

And a further object of the invention is the provision of an improved insulation means having greater insulation value than conventional insulation means of comparable size.

Yet a further object of the invention is to provide a cellulose insulation batt which can be used in either vertical or horizontal applications.

And yet a further object of the immediate invention is the provision of improved insulation structure which can be produced relatively simply and economically.

Briefly, to achieve the desired objects of the instant invention in accordance with a preferred embodiment thereof, first provided is a flexible envelope fabricated from a pair of spaced apart substantially parallel side sheets. The longitudinal and lateral edge portions of each sheet are folded inwardly and corresponding edge portions are secured together. A plurality of panels extend laterally within the envelope and divide same into a plurality of partitioned compartments. A fibrous insulation material, such as cellulosic or wood fiber, substantially fills each compartment.

In a further embodiment, each panel is angularly disposed relative each adjacent panel. Adjacent panels are joined at either longitudinal or lateral edges. Preferably, the panels are rigid and the envelope is secured to the panels to form a semi-rigid insulation structure.

The foregoing and further and more specific objects and advantages of the present invention will become readily apparent to those skilled in the art from the following detailed description of preferred embodiments thereof, taken in conjunction with the drawings, in which:

Figures 1, 2, 3, 4, 5, 6:
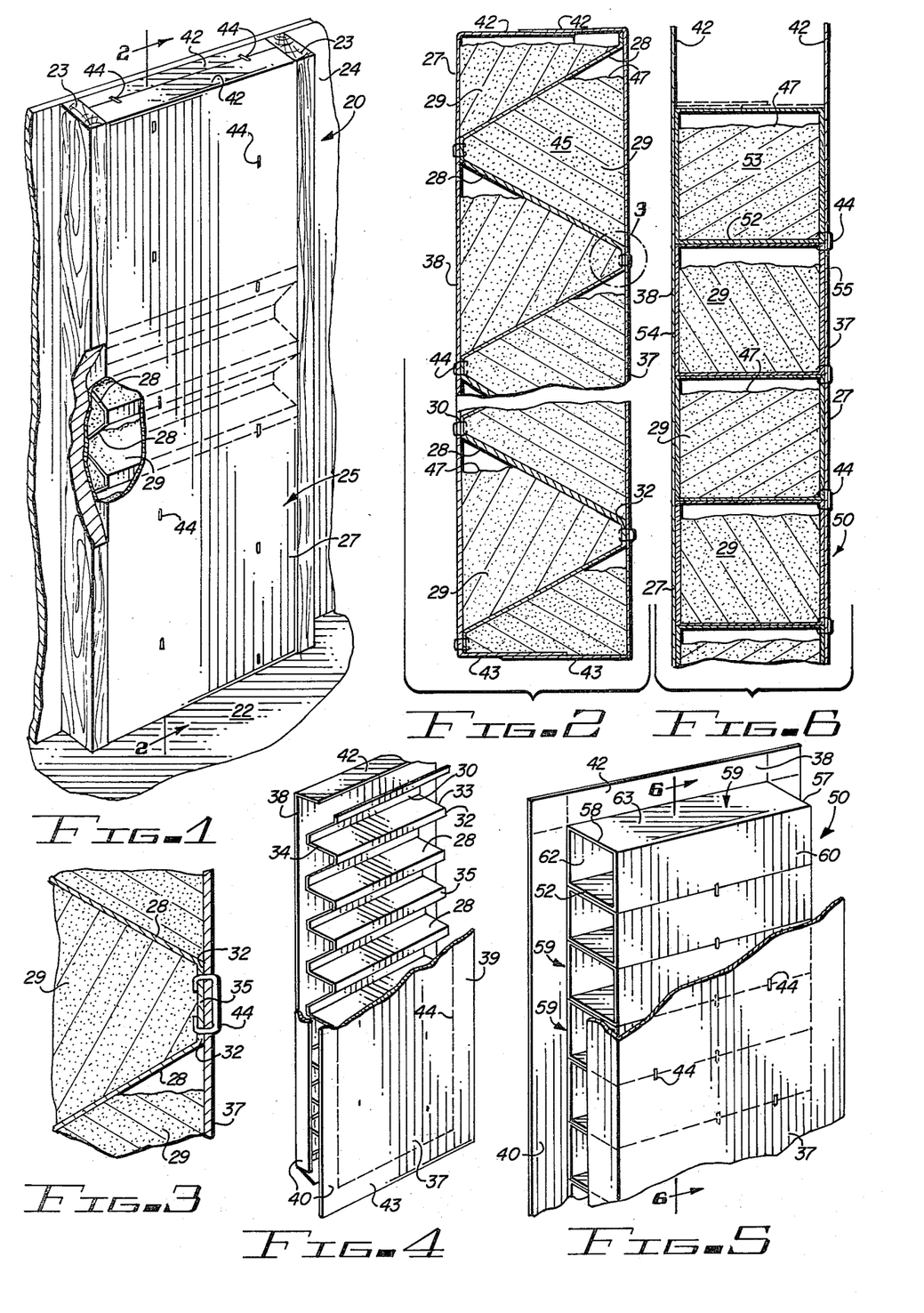
FIG. 1 is a perspective view of an insulation panel constructed in accordance with the teachings of the instant invention and partially broken away, as it would appear when installed in a partially completed conventional building structure.
FIG. 2 is an enlarged vertical sectional view taken along the line 2—2 of FIG. 1, a section thereof being broken away.
FIG. 3 is an enlarged fragmentary vertical sectional view designated by the broken line inset 3 of FIG. 3.
FIG. 4 is a perspective view of the embodiment of FIG. 1 as it would appear during an intermediate stage of fabrication.
FIG. 5 is a partial perspective view of an alternate embodiment of the instant invention, as it would appear during an intermediate stage of fabrication.
FIG. 6 is an enlarged vertical sectional view taken along the line 6—6 of FIG. 5 and showing the embodiment thereof at a later stage of fabrication.

Turning now to the drawings, in which like reference numerals denote corresponding elements throughout the several views, attention is first directed to FIG. 1, a partially completed wall 20 fabricated in accordance with conventional construction practice. Wall 20 rests upon floor 22 and extends to a ceiling, not herein specifically illustrated. Upright framing members 23, referred to as studs, extend between floor 22 and the ceiling. Framing members 23, generally two inch by four inch lumber, are spaced apart according to pre-established standards, which usually specify sixteen-inch or twenty-four-inch center-to-center measurements. Sheeting 24, such as paneling, wall-board or other material, is secured to framing members 23. While sheeting 24 is illustrated on only one side of framing members 23, it is understood that the finished wall structure includes sheeting on both sides.

The construction of ceilings is analagous to the wall structure illustrated in FIG. 1. For ceilings, the framing members are oriented horizontally and referred to as joists. FIG. 1 is further illustrative of exterior wall construction incorporating masonry products, such as bricks, blocks or preformed concrete panels. Framing members secured to a masonry outer wall, and having sheeting applied to the interior side thereof, is termed furring.

Conventionally, insulation is placed between framing members for reducing thermal conductivity through the strucutre. Insulation also functions to reduce the noise level that can pass through the structure. Various types of bulk and prefabricated insulation means are well known to those skilled in the art. Prefabricated insulation structures, having a thin flexible outer covering and filled with an insulative material, is commonly referred to as batt insulation.

An insulation structure, generally designated by the reference character 25 and fabricated in accordance with the teachings of the instant invention, is shown as it would appear in place between two framing members 23. Insulation structure 25 includes an envelope 27, a plurality of walls, or panels, each designated by the reference character 28, and a plurality of individual granules of fibrous insulation material 29.

The panels 28 are mounted in envelope 27 to divide the interior of envelope 27 into a plurality of substantially regular equilateral triangular prismatic compartments 45. Each panel 28 has first and second opposed longitudinal edges 30 and 32 and first and second opposed lateral edges 33 and 34. Panels 28 extend transversely of envelope 27. Each panel 28 is angularly disposed relative each adjacent panel 28, such that the first longitudinal edge 30 of a designated panel 28 is joined to the first longitudinal edge 30 of a respective adjacent panel 28, and the second longitudinal edge 32 of the designated panel 28 is joined to the second longitudinal edge 32 of the other respective adjacent panel 28. As specifically illustrated in the drawings, the respective edges 30 and 32 are joined by an intermediate strip 35. Intermediate strips 35 are not necessary to practice the invention, since the respective longitudinal edges of divididers 28 may be directly joined. In the immediate embodiment, the several panels 28 comprise a unitary structure formed from a rigid paper product, such as cardboard.

Envelope 27 is fabricated from a pair of sheets 37 and 38, preferably of relatively thin flexible paper product. Each sheet 37 and 38 includes first and second longitudinal terminal marginal portions 39 and 40, and first and second lateral terminal marginal portions 42 and 43. For purposes of illustration, the terminal marginal portions are set apart by the broken line 44, as specifically seen in FIG. 4, which concurrently defines the outline of the structure formed by the several dividers 28. Sheets 37, 38 forming envelope 27, define an interior space, or chamber, 46 which is a substantially rectangular parallelepiped as is best illustrated in FIGS. 1, 2 and 4.

Sheets 38 and 37 are substantially parallel and positioned on opposite sides of panels 28. In other words, sheet 37 bears against edges 32, while sheet 38 bears against edges 30 of panel 28. Marginal portions 39 and 40 are folded inwardly to bear against ends 33 and 34, of each panel 28, respectively. Similarly, first lateral marginal portion 42 and second lateral marginal portion 43 of the respective sheets 37 and 38 are folded inwardly along longitudinal edges of the extreme outboard panels 28. Corresponding longitudinal and lateral terminal marginal portions of the sheets 37 and 38 are secured together by overlapping and stapling, as especially illustrated with respect to marginal portions 42 and 43 in FIG. 2.

The bend or fold along the longitudinal edges 30 and 32 of the panels 28 impart lateral rigidity to the insulation structure 25. Periodically spaced mechanical fasteners, such as staples 44, pass through each sheet 37 and 38 and respective intermediate strips 35, as best illustrated in FIG. 3. In longitudinal section, as viewed in FIG. 2, the sheets 37 and 38, together with the several panels 28, form a triangularly trussed structure. Accordingly, longitudinal rigidity is imparted to insulation structure 25.

With particular reference to FIG. 2, it is seen that panels 28 divide space 46 within envelope 27 into a plurality of substantially regular triangular prismatic closed compartments 45. Each compartment 45 is defined by a pair of adjacent panels 28 and an appropriate section of eith sheet 37 or 38 with the edges 30, 32 of the panels defining the lateral edges of the compartments 45. Each compartment 45 extends from one side 40 of envelope 27 to the other side 39.

During manufacture, each compartment 45 is substantially filled with a fibrous insulation material. A preferred insulation material is the ground and treated cellulosic or wood fiber product commonly referred to as loose fill insulation as especially adapted for pneumatic or poured application. Commonly, cellulose is produced from recycled paper that is chemically treated to be non-toxic and to be resistant to fire, rodents, corrosion, fungus and other deteriorators.

Advantageously, cellulose exhibits an extremely high thermal insulative value. Disadvantageously, however, cellulose has a settle density of approximately two to three percent. Prior to the advent of the instant invention, a satisfactory solution to the settling characteristics of cellulose had not been achieved. Neither had the prior art provided a batt type insulation structure, blanket or panel, utilizing granular filler that could be cut to desired length.

The insulative material 29, as depicted in FIG. 2, is especially representative of cellulose that has settled between the time of manufacture and the time of installation. The material 29 in each compartment 45 has settled to a level 47 which is below the respective edges 30 and 32 of the upper panel 28 of each compartment 45. The distance from each edge 30 or 32 to the respective level 47, representing the percent of settling of the material 29, is exaggerated for purposes of illustration.

Nevertheless, it is apparent that the insulative value of insulation structure 25 is relatively unaffected by the settling of material 29.

With respect to FIG. 2, it is also apparent that insulation structure 25 may be cut to any desired length. The panel can be severed at the first intermediate strip 35 above the desired length, which will preserve the integrity of the compartment 45 in which the actual dimension falls. Depending upon the angular disposition of the panels 28, the actual length of the structure 25 will exceed the desired length by only approximately one or two inches. During installation, the uppermost compartment can be crushed downwardly to accommodate the height of the space to be insulated.

The foregoing comments are also applicable to structure 25 when used in a horizontal attitude. The only exception is that level 47 will appear in close proximity to one of the sheets 37 or 38.

FIGS. 5 and 6 illustrate an alternate insulation structure, designated by the reference character 50, constructed in accordance with the teachings of the instant invention. Envelope 27, previously described in connection with the embodiment generally designated by the reference character 25, is also common to the immediate embodiment.

Similar to previously described panels 28, panels 52 extend transversely of the insulation structure 50, dividing envelope 27 into a plurality of partitioned compartments 53, each substantially filled with insulation material 29. Each panel 52 includes first and second longitudinal edges 54 and 55, respectively, and first and second lateral edges 57 and 58, respectively.

In deference to the previously described embodiment, the several panels 52 are parallel to each other and perpendicular to the sheets 37 and 38. Each panel 52 represents one side of a tubular element 59 which also includes sides 60, 62 and 63. For purposes of illustration, tubular element 59 is shown with a generally square cross-section, however, it is understood that elements 59 may have any rectangular cross-section. Periodically spaced staples 44 secure each tubular element 59 to each adjacent tubular element 59 and to envelope 27.

Figures 7, 8, 9, 10:
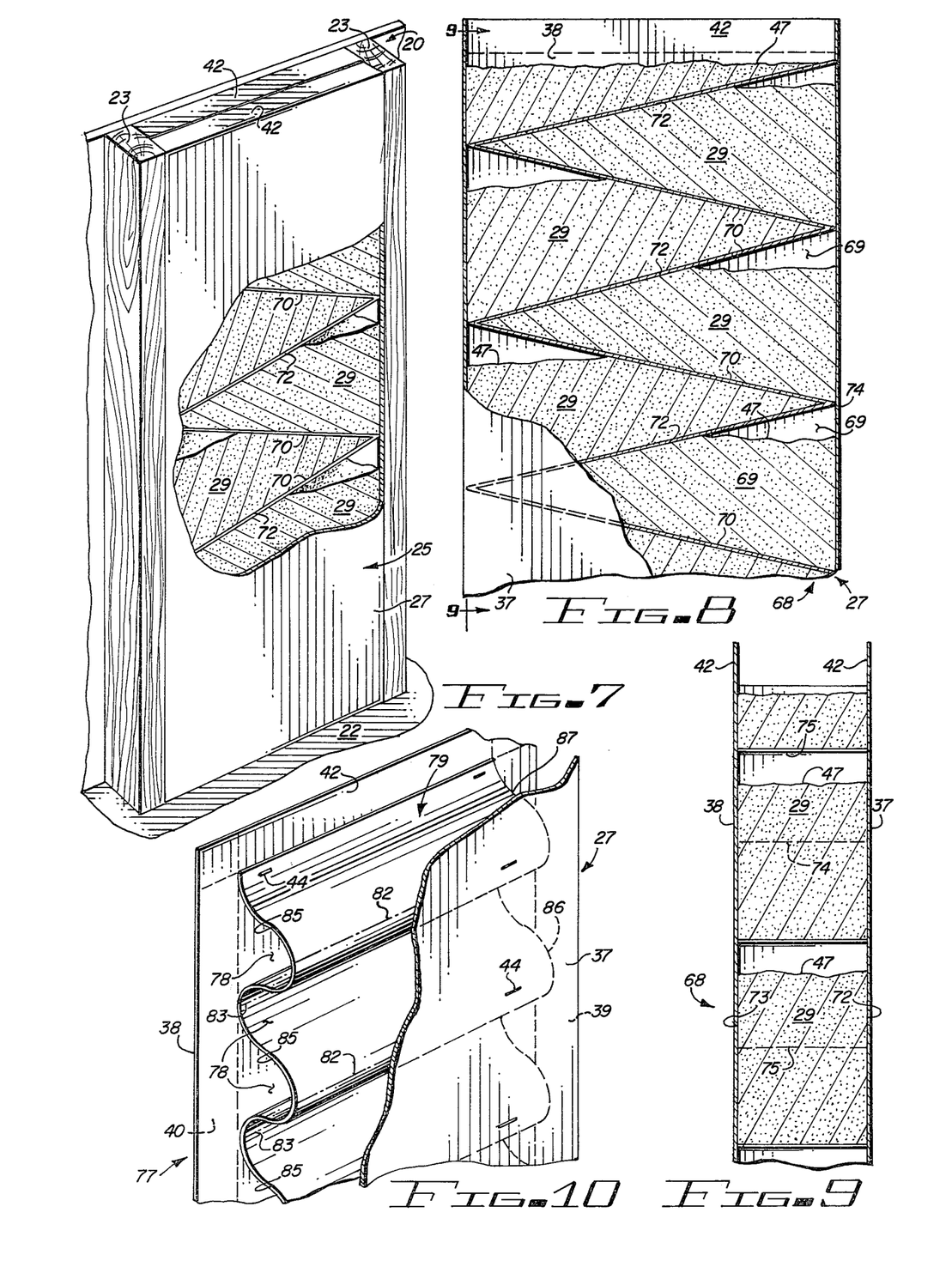
FIG. 7 is a view generally corresponding to the illustration of FIG. 1, and depicting another embodiment of the instant invention.
FIG. 8 is an enlarged front view of the embodiment of FIG. 7, with portions thereof being broken away.
FIG. 9 is a vertical sectional view taken along the line 9—9 of FIG. 8.
FIG. 10 is a partial perspective view of yet another alternate embodiment of the instant invention as it would appear during an intermediate stage of fabrication.

Another embodiment of the instant invention, generally designated by the reference character 68, is seen in FIGS. 7, 8 and 9. In general similarity to the previously described embodiments, insulation structure embodiment 68 includes envelope 27, formed from sheets 37 and 38, which is divided into a plurality of partitioned compartments 69 by transverse panels 70. Each compartment 69 is substantially filled with insulation material 29 which settles to level 47.

Each panel 70 includes first and second longitudinal edges 72 and 73, respectively, and first and second lateral edges 74 and 75, respectively. The lateral edges of each panel 70 is secured to the respective lateral edge of each adjacent panel 70. That is, first lateral edge 74 of one panel 70 is secured to the first lateral edge 74 of one adjacent panel 70, while second lateral edge 75 is secured to the second lateral edge 75 of the other adjacent panel 70. Accordingly, each panel 70 is angularly disposed relative each adjacent panel and the several panels 70 are perpendicular to sheets 37 and 38.

The various elements, sheets 37 and 28 and panels 70, of insulation structure 68 are secured together by a suitable adhesive. The adhesive is applied to the contact areas between the longitudinal and lateral edges of the panels 70 and the sheets 37 and 38. The terminal marginal portions of the sheets 37 and 38 are overlapped and also secured by adhesive. The respective lateral edges 74 and 75 of the dividers 70 may be secured together by adhesive, or alternately, the several panels 70 may be fabricated from a single strip of material, especially cardboard, which is periodically folded to concurrently define the respective lateral edges of adjacent panels 70.

The insulative material 29 in each compartment 69 is subject to settling as previously described. Since the settling for the entire structure 68 is distributed throughout the several compartment 69, the spaces created thereby are relatively insignificant. It is to be understood that the settling of the material, as indicated by the level line 47, is grossly exaggerated for purposes of illustration. The settling is of no concern when the insulation structure is used in the horizontal position.

Illustrated in FIG. 10 is yet another embodiment of an insulation structure, generally designated by the reference character 77, in which sheets 37 and 38 are used to form envelope 27. Envelope 27 is divided into partitioned compartments 78 by inner member 79. While inner structure 79 is unitary, it can be considered that structure 79 comprises a plurality of S-shaped adjacent panels which are joined along broken lines 82 and 83 which also represent the first and second longitudinal edges, respectively, of the several panels 80. Each panel 80 further includes first lateral edge 85 and second lateral edge 87.

Each panel 80 extends transverse of envelope 27. Sheets 37 and 38 are secured to inner structure 79 by staples 44. The terminal marginal portions of sheets 37 and 38 are secured either by stapling or adhesive bonding as previously described. In other aspects, the immediate embodiment is analogous to the previously described embodiments.

Figures 11, 12, 13, 14:
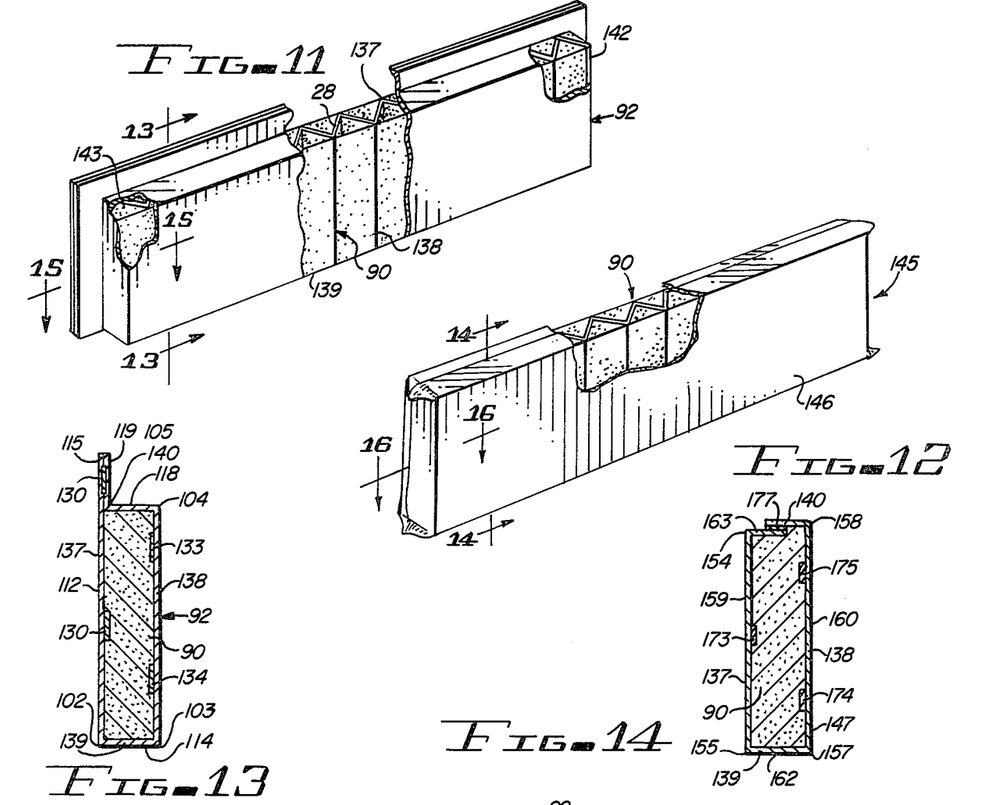
FIG. 11 is a perspective view of an alternate insulation panel embodying the principles of the instant invention.
FIG. 12 is a perspective view of yet another embodiment of the instant invention.
FIG. 13 is an enlarged vertical section view taken along the line 13—13 of FIG. 11.
FIG. 14 is an enlarged vertical section view taken along the line 14—14 of FIG. 12.
Figure 17:
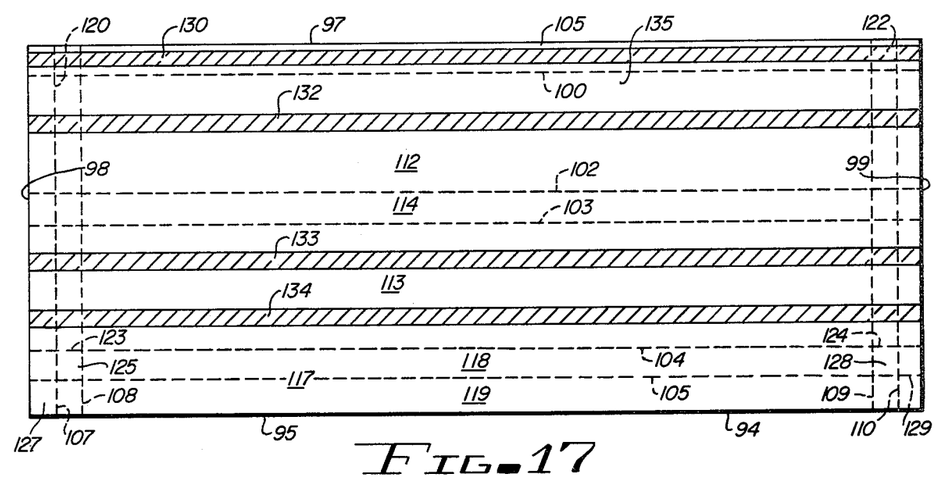
FIG. 17 is an enlarged plan view of a sheet of material useful in forming the envelope in connection with the embodiment of FIG. 11, as the sheet would appear prior to folding into an envelope and, FIG. 18 is an enlarged plan view of a sheet of material seen as it would appear prior to folding into an envelope useful in connection with the embodiment of FIG. 12.

As seen in the foregoing embodiments, the several transverse panels which divide the envelope into partitioned compartments can be considered a unitary core structure. Specifically, the several panels 28, as especially seen in FIGS. 1, 2, 3 and 4 form the unitary core structure generally designated by the reference character 90 as further illustrated in the alternate embodiment generally designated by the reference character 92 as seen in FIG. 11 and further illustrated in FIGS. 13 and 15. Envelope 93 enclosing core structure 90 is fabricated from a single sheet of material 94 as seen in FIG. 17 in the flat form prior to folding.

The sheet of material 94 which is larger than the combined surface area of unitary core structure 90 includes first longitudinal edge 95, second longitudinal edge 97 and first and second lateral edges 98 and 99 respectively. For purposes of reference, sheet 94 is considered to be divided into longitudinal sections as represented by the broken lines 100, 102, 103, 104 and 105. Similarly, sheet 94 is divided laterally by broken lines 107, 108, 109 and 110. First side sheet 112 lying between edge 97 and line 102 and second side sheet 113 lying between line 103 and edge 95 are separated by intermediate longitudinal portion 114 residing between lines 102 and 103.

First side sheet 112 includes longitudinal marginal portion 115 lying between line 100 and edge 97. Longitudinal marginal portion 117 of sheet 113 includes first section 118 between lines 104 and 105 and second section 119 lying between line 105 and edge 95. First side sheet 112 further includes first lateral terminal marginal portion 120 lying between line 108 and edge 98 and second lateral terminal marginal portion 122. Similarly, second side sheet 113 includes first lateral terminal marginal section 123 lying between edge 98 and line 108 and second lateral terminal marginal portion 124 lying between line 109 and edge 99. First lateral terminal marginal portion 123 includes first section 125 lying between lines 107 and 108 and second section 127 lying between line 108 and edge 98. Second lateral terminal portion 124 includes first section 128 lying between lines 109 and 110 and second section 129 lying between line 110 and edge 99.

First, second, third and fourth adhesive strips 130, 132, 133 and 124, respectively, extend longitudinally of the sheet of material 94. First adhesive strip 130 resides on marginal portion 15 while second adhesive strip 132 resides in an intermediate position on first side sheet 112. Third and fourth adhesive strips 133 and 134 respectively are carried by second side sheet 113. The side of the sheet of material 94 seen in the illustration and carrying the several adhesive strips and designated by the reference character 135 is considered the face.

For further orientation, unitary core structure 90 is considered to have a first side 137 and a second side 138 as defined by the longitudinal edges of the several panels 28. First longitudinal edge 139 and second longitudinal edge 140 are created by the lateral edges of the several panels 28. First and second lateral edges 142 and 143, respectively, of course structure 90 are defined by the respective terminal panels 28.

Figure 15:
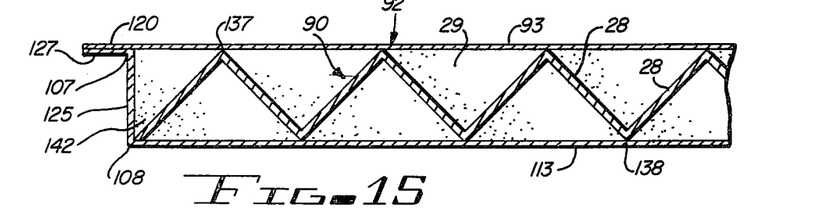
FIG. 15 is an enlarged fragmentary horizontal sectional view taken along the line 15—15 of FIG. 11.

Referring more specifically to FIGS. 13 and 15, the structure of envelope 92 formed from sheet of material 94 is clearly illustrated. Intermediate section 114 of sheet 94 resides against first longitudinal edge 139 of core structure 90 and is folded along lines 102 and 103 positioning side sheets 112 and 113 against sides 137 and 138 respectively. Folding at line 104 positions first section 118 against second longitudinal edge 140 and again folding at line 105 places second section 119 against the terminal marginal portion 115. With the application of pressure, adhesive strip 130 secures marginal portion 115 to section 119. As especially seen in FIG. 15, lateral terminal portion 123 is first folded along line 108 and then along line 107 to bring section 125 against lateral edge 143 and second section 127 against terminal portion 120. Section 127 and portion 120 are intermittently secured by the several adhesive strips. Although not specifically illustrated, it will be appreciated that a similar arrangement including sections 128 and 129 and portion 122 is affected at lateral edge 142.

Over the embodiment 145 as seen in FIG. 12 also includes unitary core structure 90 which is enclosed within envelope 146. Analogous to envelope 93, envelope 146 is fabricated from a single sheet of material 147 having first and second longitudinal edges 148 and 149 respectively, first and second lateral edges 150 and 152 respectively and face 153.

Figure 18:
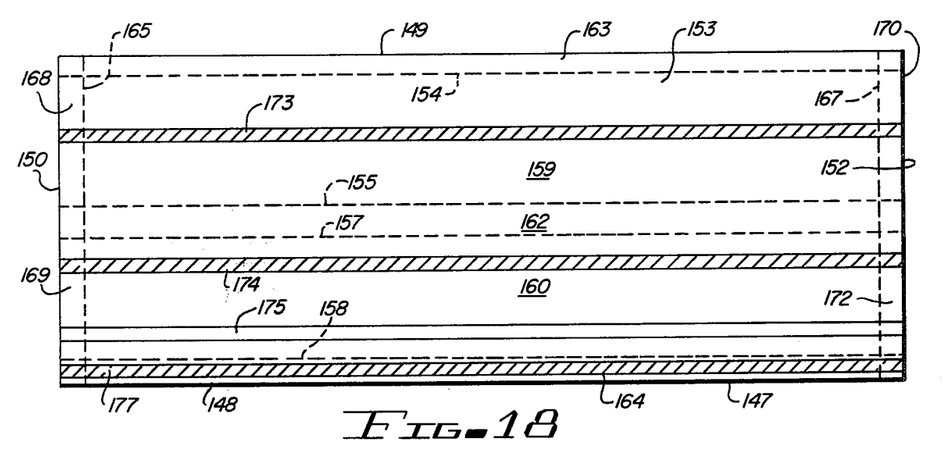

Longitudinally extending first, second, third and fourth broken lines 154, 155, 157, 158, respectively, divide the sheet of material 147 into a first side sheet 159 lying between lines 154 and 155, a second side sheet 160 residing between lines 157 and 158 and an intermediate longitudinal portion 162 residing between first and second side sheets 159 and 160 respectively. Longitudinal marginal portion 163 of first side sheet 159 lies between line 154 and edge 149 while longitudinal marginal portion 164 associated with second side sheet 160 is bounded by line 158 and edge 148.

The sheet of material 147 is also divided by first and second laterally extending broken lines 165 and 167 respectively. Line 165 and edge 150 define first lateral terminal marginal portion 168 of first side sheet 159 and first lateral terminal marginal portion 169 of second sheet 160. Similarly, line 167 in combination with edge 152 define second terminal marginal portions 170 and 172 of first and second side sheets 159 and 160 respectively. Similar to the previously described adhesive strips, first, second and third adhesive strips 173, 174, 175 and 177 respectively, extend longitudinally of the sheet of material 147. Adhesive strip 173 extends along first side sheet 159 while spaced apart adhesive strips 174 and 175 are carried by second side sheet 160. Fourth adhesive strip 177 is within longitudinal marginal portion 164.

As seen in FIG. 14, intermediate longitudinal portion 162 of envelope material 147 is positioned against first longitudinal edge 139 of core structure 90. Folds are made along lines 155 and 157 bringing first side sheet 159 in position against first side 137 and second side sheet 160 against second side 138. First adhesive strip 173 secures sheet 159 to side 137 while the second and third adhesive strips 174, 175 respectively, affix second side sheet 160 to second side 138. Longitudinal terminal marginal portion 163 is folded along line 154 against second longitudinal edge 140 and subsequently longitudinal terminal marginal portion 164 is folded along line 158 against second longitudnal edge 140 and overlapping portion 163. Terminal marginal portions 163 and 164 are secured by fourth adhesive strip 174.

Figure 16:
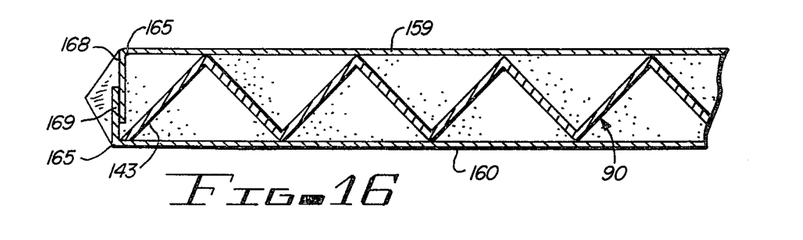
FIG. 16 is an enlarged fragmentary horizontal sectional view taken along the line 16—16 of FIG. 12.

At first lateral end 143 of core structure 90, is seen in FIG. 16, lateral terminal portions 168 and 169 are folded along lines 165 with portion 169 overlapping portion 168 and secured thereto by the several intermittent adhesive strips. At the second lateral edge 142 of core structure 90 terminal portions 170 and 172 are similarly folded along line 167 and similarly affixed.

Various changes to the embodiments herein chosen for purposes of illustration wil readily occur to those skilled in the art. For example, while the use of adhesives has been included in the descriptions of certain embodiments while staples have been described in connection with other embodiments, it is within the scope of the invention that adhesives and staples are interchangeable securement or bonding means. Other mechanical and chemical fastening means will also occur to those skilled in the art. Further, specific numbers of adhesive strips have been chosen for purposes of illustration in connection with certain embodiments. It is within the spirit and the scope of the invention that the number and width of adhesive strips are optional with the manufacturer bearing in mind the desired ultimate structure. In fact, the entire surface of the envelope sheet, though not necessarily desireable, may be coated with a suitable pressure-sensitive adhesive. Various other changes and modifications will readily occur to those skilled in the art. To the extent that such modifications and variations to not depart from the spirit of the invention, they are intended to be included within the scope thereof which is limited only by a fair interpretation of the following claims.

Having fully described and disclosed the present invention and preferred embodiments thereof in such clear and concise terms as to enable those skilled in the art to understand and practice the same, the invention claimed is:

1. The thermal insulation structure comprising:

a front sheet, a back sheet, a pair of side sheets, a top sheet and a bottom sheet forming an envelope defining a space which is substantially a rectangular parallelepiped, said front, back and side sheets having a length and a width, the length of said front, back and side sheets being substantially equal, the width of the front and back sheets being substantially greater than the width of the side sheets;

substantially rigid panel means having edges mounted in said space for dividing said space into a plurality of substantially regular equilateral triangular prismatic closed compartments having lateral edges defined by said rigid panel means, edges of said rigid panel means defining lateral edges of said compartments and being secured to the front and back sheets of said envelope, said lateral edges of the compartments being substantially perpendicular to the side sheets; and a plurality of individual granules of a cellulose material substantially filling said compartments.

2. The thermal insulation structure of claim 1 in which the sheets forming the envelope are made of flexible paper.

3. The thermal insulation structure of claim 2 in which the rigid panel means are made of cardboard.

4. The thermal insulation structure of claim 3 in which the compartments extend from one side wall of the envelope to the other.

* * * * *